United States Patent
Sullivan

[15] 3,660,945
[45] May 9, 1972

[54] METHOD AND APPARATUS FOR MACHINING RINGS

[72] Inventor: Edward F. Sullivan, Saginaw, Mich.
[73] Assignee: B & K Tool & Die Corporation, Saginaw, Mich. a part interest
[22] Filed: Apr. 6, 1970
[21] Appl. No.: 26,027

[52] U.S. Cl. ..................................................51/73 R
[51] Int. Cl. .........................................B24b 7/00, B24b 9/00
[58] Field of Search.........................................144/49; 51/73

[56] References Cited

UNITED STATES PATENTS 2,422,418   6/1947   Hutto...................................51/73 X
3,296,747   1/1967   Philippsen et al.........................51/73

Primary Examiner—Othell M. Simpson
Attorney—Learman & McCulloch

[57] ABSTRACT

Method and apparatus for honing or lapping ring-shaped piston rings, having a gap therein, including mechanism for individually stripping rings from a stack of rings and feeding them individually through a cylindrically shaped lapping drum along the horizontal axis thereof while simultaneously relatively rotating the drum and workpiece. In one version of the machine, as the rings are passing through the drum, the drum is oscillated slightly about a vertically extending axis. After the rings are moved through the cylindrically shaped lapping drum, they are discharged.

15 Claims, 9 Drawing Figures

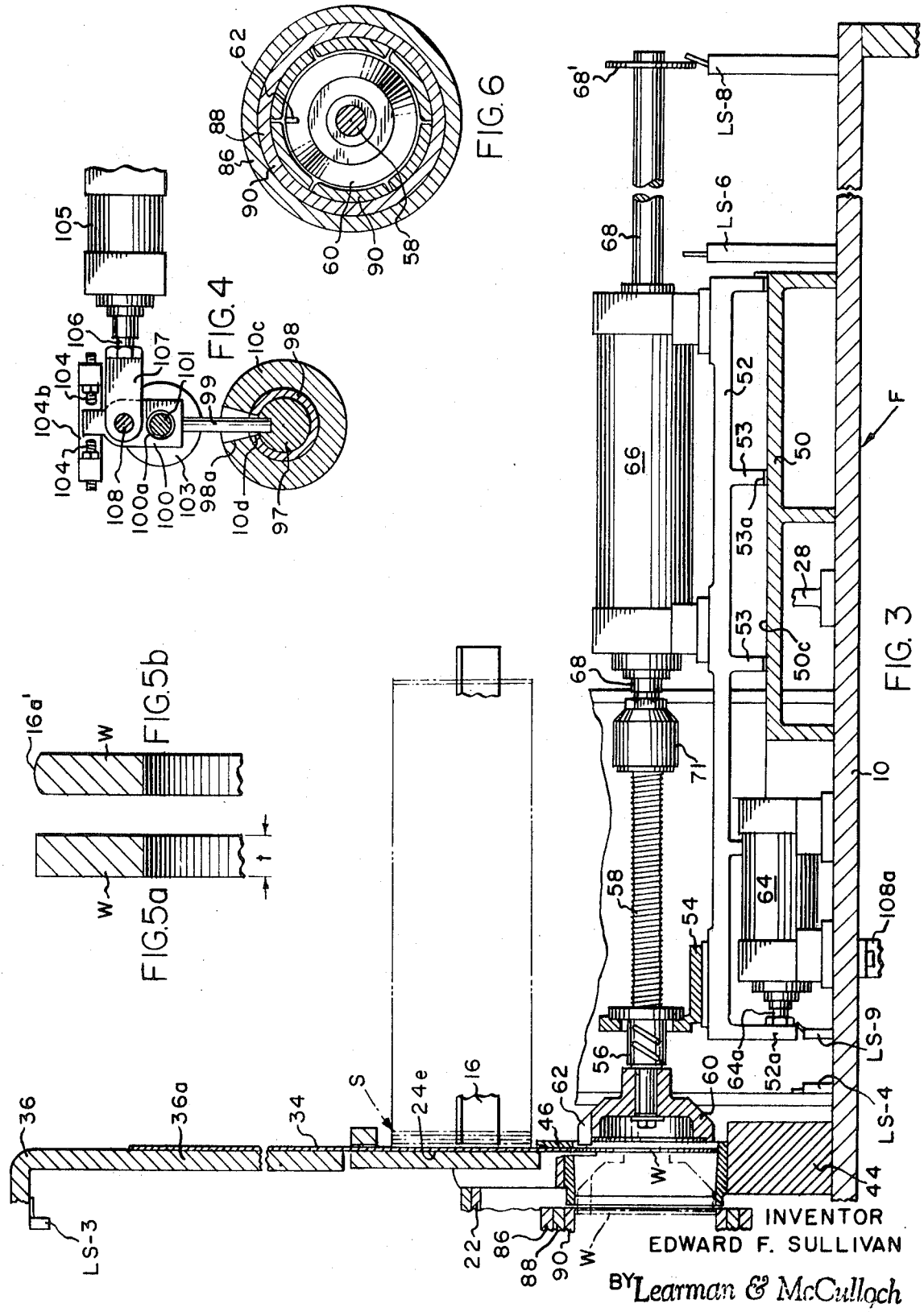

METHOD AND APPARATUS FOR MACHINING RINGS

This invention relates to methods and apparatus for individually machining piston rings having a gap therein. In one aspect thereof, this invention relates to methods and apparatus for individually machining piston rings having an outer peripheral surface which is curvilinear between the ends of the rings.

Piston ring machining apparatus has been provided in the past, however, operation of this apparatus is dependent upon extensive manual handling of the rings both before the machining operation, to properly position the rings on a multiple ring carrier, and after the machining operation, to remove the rings therefrom.

Piston rings of uniform external diameter are well-known and so are machines for simultaneously machining a stack of such rings. However, other piston rings must be barrel-shaped, in which case the axial end portions of the rings are formed with a reduced diameter so that the outer peripheral surface between the ends of the ring is curvilinear. The known prior art machines of this character do not lend themselves to the machining of barrel type rings.

According to the present invention, therefore, it is an object of the present invention to provide a method and an apparatus for automatically loading individual rings and moving them individually through a machining station, prior to automatically discharging the rings after they have been machined.

Another object of the present invention is to provide a method and an apparatus for machining barrel-shape piston rings.

Yet another object of the present invention is to provide a method and an apparatus for moving piston rings through a machining cylinder along a longitudinal axis while simultaneously oscillating the machining cylinder about a transverse axis.

A further object of the present invention is to provide a method and an apparatus for machining ring-shaped piston rings have a gap therein by rotating a machining cylinder in one direction and simultaneously individually rotating the piston rings in an opposite direction.

A still further object of the present invention is to provide a method and an apparatus for individually stripping ring-shaped piston rings, having a gap therein, from a stack of such rings, individually feeding the rings to an actuating plunger which moves the rings through an oscillating machining drum, and discharging the machined workpieces at the opposite end of the machining drum.

Briefly, according to the present invention, there is provided a method and apparatus for machining expansible and contractible ring-shaped workpieces having a gap therein comprising: tubular machining means forming a machining station for receiving a workpiece and machining the radially outer peripheral surface of such a workpiece, workpiece holding and positioning means for individually receiving and positioning unmachined workpieces on one side of the machining station, the workpiece holding and positioning means and the machining means being relatively axially reciprocably movable and relatively rotatable, drive means for relatively axially moving the workpiece holding and positioning means and the machining means toward and away from each other to move a workpiece from one side of the machining station through the machining station to the other side of the machining station, and means for relatively rotating the holding and positioning means and the machining means when a workpiece is axially passed through the machining station, the holding and positioning means including means receivable in the workpiece gap for holding the workpiece in the machining means when the machining means and the holding and positioning means are being relatively axially moved in a manner such that the workpiece is released when it reaches the opposite side of the machining station.

Other objects and advantages of the present invention will become apparent to those of ordinary skill in the art by the following description which when considered in relation to the accompanying drawing of which:

FIG. 3 is an enlarged, fragmentary, sectional side elevational view illustrating the ring feeding mechanism in an axially rearward position and the ring supplying guillotine member in a vertically lowered position, an axially adjusted position of the ring feeding mechanism being shown in chain lines;

FIG. 4 is a slightly reduced, fragmentary top plan section view of the mechanism for oscillating the machining drum, taken along the line 4—4 of FIG. 1;

FIGS. 5a and 5b are fragmentary sectional views taken through a typical "flat" type ring and "barrel" type ring, respectively;

FIG. 6 is an enlarged fragmentary vertical sectional view through the machining cylinder, taken along the line 6—6 of FIG. 1;

FIG. 7 is a front elevational view of a typical "flat" type workpiece which may be machined by the apparatus illustrated in FIGS. 1–4 and 6.

THE GENERAL SYSTEM

Figure 1:
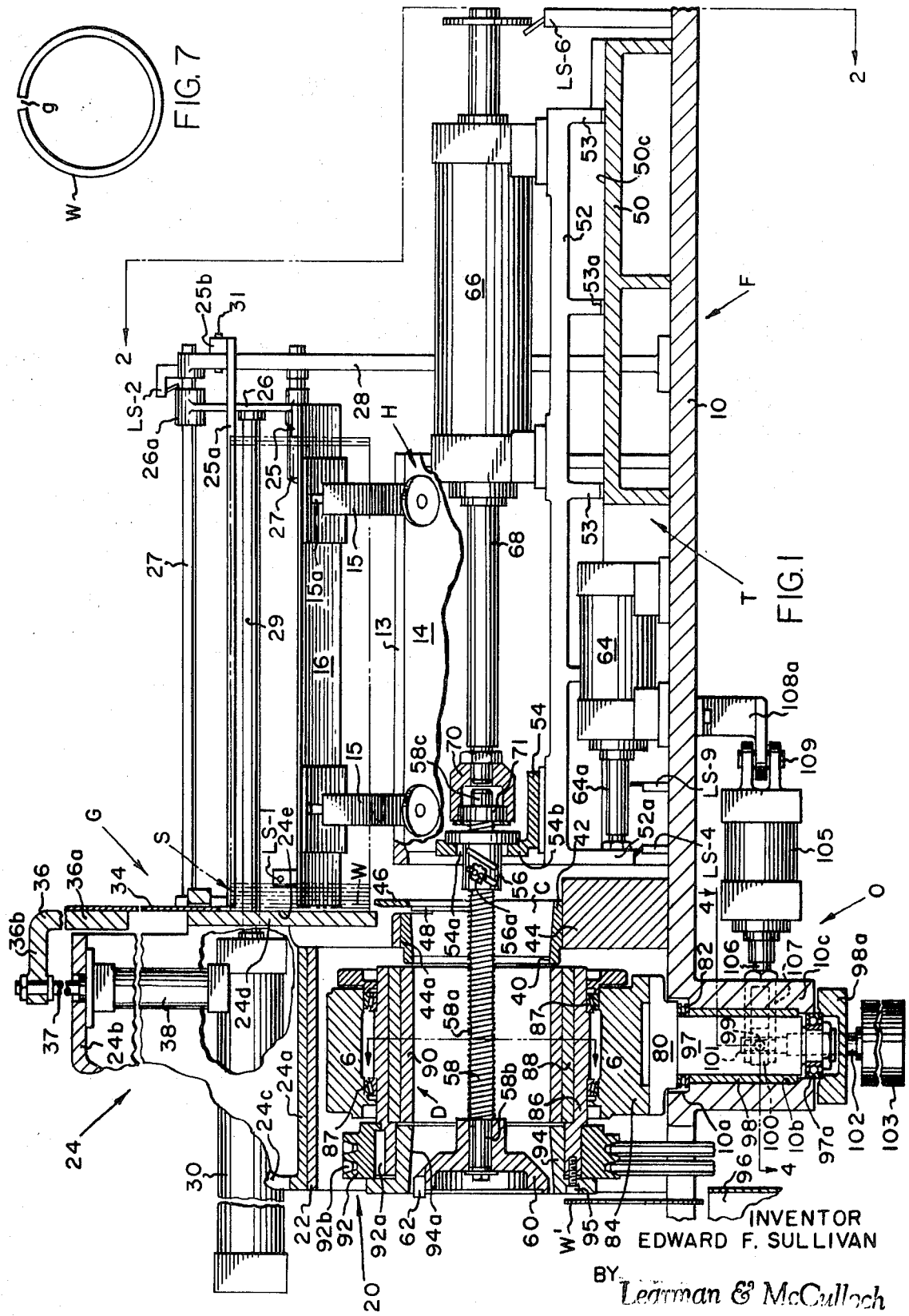
FIG. 1 is a partly sectional, side elevational view of apparatus constructed according to the invention, and illustrating the workpiece feeding mechanism in the workpiece discharge position, parts of the apparatus being broken away to more clearly illustrate portions thereof.

Referring now more particularly to the drawings, apparatus formed according to the preferred embodiment of the invention generally includes a guillotine stripping mechanism, generally designated G, for successively individually stripping an endmost workpiece W from a stack S of such workpieces and transferring it individually to a closing sleeve C. Transfer apparatus, shown generally at T, is provided for individually moving the workpieces W, in a single pass, through a lapping or housing station formed by a honing or lapping cylinder, indicated generally at D, and discharging the machined workpiece W' on the other side of the lapping cylinder. An oscillating mechanism, generally designated O, is also provided in the machine illustrated for oscillating the lapping cylinder D as barrel-shaped rings are individually passed therethrough to machine the outer peripheral, curvilinear surface of the workpieces in a manner to be described more fully hereinafter. The barrel-shaped ring (FIG. 5b) is generally similar to the flat ring (FIG. 5a) but includes an outer surface 16a' which is curvilinear between its ends.

THE STACK SUPPORTING MECHANISM

Apparatus constructed according to the invention is mounted on a frame, generally designated F, which includes a top wall 10 spanning a pair of side walls 12. Mounted atop the frame F is a housing H, including a pair of side walls 14 supported on the wall 10 and a top wall 13 spanning the side walls 14.

Mounted on the housing H are two longitudinally extending, vertically inclined, stack supporting plates 16 forming a V-shaped way for supporting a stack S. The plates are supported for adjusting movement on the terminal T-shaped ends of members 15a which are slidably received within housings 15 mounted on the upper portion of the opposite side walls 14 on blocks 17. The members 15a are adjustable within the housings 15 by means of adjustment screws 15b threadedly received by members such as nuts (not shown) in the housing 15.

THE STRIPPING MECHANISM

On the left side of the frame F, as viewed in FIG. 1, another housing, generally designated 20 is provided to house the machining drum D and includes side walls 21 supported on the wall 10, and an upper support wall portion 22 spanning the walls 21. A housing 24 is mounted atop the housing 20 and includes a bottom wall 24a, a top wall 24b, an inclined rear wall 24c and a partial front wall 24d. The stack S of workpieces W is urged toward the outer face 24e of the wall 24d by a generally horizontally disposed pusher bar 25 (FIG. 2) connected at one end with a bracket 26 having slide bearings 26a slidably mounted on a pair of vertically spaced rods 27. The opposite ends of the rods 27 are secured by the housing 24 and a vertically extending bracket 28 mounted on the wall 10. The bracket 26, mounting the pusher 25, is connected with the piston rod 29 of a pneumatic cylinder 30 which continually maintains a substantially constant pressure on the piston 29, urging the bracket 26 and the pusher member 25 toward the left as viewed in FIG. 1 in such manner as to releasably clamp the endmost workpiece W of the stack S against the face 24e of the plate 24d.

Each of the piston rings W (FIG. 7) is provided with a gap g. When a stack S is positioned on the support plates 16, the gaps g of each of the piston rings W in the stack S are longitudinally aligned so as to receive a longitudinally extending, guide bar 25a connected at one end with a rod 25b which is pivotally mounted on a pivot pin 31 fixed to the bracket 28. The gap of a typical piston ring W, having a radial wall thickness of approximately 0.190 inches and an outside diameter of 3.875 inches, may be 0.010–0.020 inches wide. The ends of the bar 25a and support plates 16 adjacent the face 24e of the wall 24d are spaced from the end face 24e a distance slightly greater than the thickness t (FIG. 5a) of one ring W, but slightly less than the thickness of two rings, to permit a workpiece W to pass therebetween when the guillotine G is moved downwardly. The rod 25b is biased to the position shown in FIG. 2 against a stop pin 32b on the bracket 28 by a spring 32 connected between the bracket 28 and the rod 25b. The rod 25b may be quickly swung upwardly when a new stack S is to be positioned on the plates 16.

THE GUILLOTINE MECHANISM

For individually removing the workpieces W from the stack S supported on the plates 16, the guillotine G comprises a thin flat plate 34, having a thickness at least no greater than the thickness t of a piston ring W, which is bolted or otherwise suitably secured to one leg 36a of an L-shaped bracket 36. The bracket 36 and the guillotone plate 34 are vertically movable from the guillotine supporting position shown in FIG. 1 to the position shown in FIG. 2 by a piston rod 37, which is connected to the other leg 36b of the bracket 36 and operated by a double-acting, solenoid operated, hydraulic or pneumatic cylinder 38 which is secured to the under side of the upper wall 24b of the housing 24. The free terminal end portion of the plate 34 is formed with a curvilinear recess 34a (FIG. 2) which generally conforms to the outer cylindrical configuration of the workpiece W.

As the plate 34 is moved downwardly, the endmost workpiece W is moved downwardly and is guided by an enlarged guide portion 46, forming the end of the closing sleeve C, into a semi circular slot 48 formed in the upper half of the sleeve C adjacent the guide member 46. The sleeve C includes a portion 42 forming a passage having a uniformly tapered internal diameter and a portion 40, at its other end, forming a passage of substantially constant diameter. The sleeve C is secured within an aperture 44a provided in a support 44 mounted on the wall 10. As the plate 34 of the guillotine G moves a workpiece W downwardly, it is guided by the guide 46 into the slot 48 until the workpiece rests in the closing sleeve C in the full line position shown in FIG. 3. The guillotine G is then returned to the position shown in FIG. 1.

TRANSFER APPARATUS

The transfer apparatus T, for moving the workpieces W axially through the tapered bore of the closing sleeve C and through the machining drum D, includes a lower guide member 50 fixedly secured to the upper surface of the wall 10. A longitudinally extending recess 50a is formed in the upper surface of the guide member 50 for slidably receiving the rear portion of a longitudinally movable slide 52 which has a plurality of parallel, spaced apart supporting walls 53 formed with hardened runner portions 53a, along the lower surfaces thereof, which ride on the surface 50c of the recess 50a. At its front end, the slide 52 mounts an L-shaped bracket 54 having an aperture 54a in the vertically extending leg 54b thereof. A recirculating ball-type nut 56, such as disclosed in U.S. Pat. No. 3,124,969, is welded or otherwise suitably fixed to the leg 54b, is received within the recess 54a, and includes a plurality of recirculating balls 56a received within the grooves 58a of a screw 58 in the normal manner.

The front end 58b of the screw 58 is keyed to a workpiece positioning ring 60 having a radially extending positioning fin 62 extending slightly axially forwardly of the ring 60 at the outer peripheral edge thereof. The width of the fin 62 is slightly less than the width of the gap g in a piston ring to be machined, so as to be receivable therein when the positioning ring 60 is moved axially toward the left from its position shown in FIG. 3. When the workpiece W is moved downwardly from the stack S to the closing sleeve C, it is slid downwardly without being rotated so the relative angular position of the gap g does not change during this downward movement. Thus, the gap g will be positioned directly above the axis of the lapping screw 58 when the ring is received in sleeve C. As shown in the drawing, the fin 62 is located above the axis of the screw 58 and in axial alignment with the gap g of the workpiece positioned in the closing sleeve C.

To move the fin 62 into the gap g of a workpiece W positioned in the closing ring C, a slide cylinder 64 is fixed on the top wall 10 and includes a piston rod 64a connected with a lug 52a depending from the forward portion of the slide 52. After the cylinder 64 has moved the positioning fin 62 into the gap g, it will continue to move the ring 62 and workpiece W from the full line position shown in FIG. 3 to the chain line position shown in FIG. 3 to constrict the workpiece W so as to cause the gap g to close tightly around the positioning fin 62 as the workpiece is moved into the portion 40 of the closing sleeve C.

To move a workpiece W from the position shown in chain lines in FIG. 3 through the lapping drum D to the position shown in FIG. 1, a double-acting solenoid operated pusher cylinder 66 is mounted atop the slide 52 and includes a piston rod 68 mounting a cup-shaped bearing bracket 70 at its terminal end. The end 58c of the screw 58 is journaled in a bearing 71 secured within the bearing bracket 70. As the piston rod 68 is moved forwardly from the dotted line position shown in FIG. 3, the screw 58 will be rotated by the recirculating ball nut 56 and thus will rotate the workpiece W as it axially drives it through the lapping drum D.

THE LAPPING DRUM

Apparatus for supporting the lapping drum D includes a turntable 80 rotatably supported on bearings 82 provided in a recess 10a of the housing 10. A drum housing 84 is fixed to the turntable 80 and journals an annular driving sleeve 86 therein by means of roller bearings 87. Removably mounted in a holder sleeve 88 provided within the sleeve 86 is a plurality of interchangeable cast iron lapping or hone members 90 (FIG. 6). The drum D, including the members 90, is rotated by means of a belt 92b which is driven by a motor M–1 (FIG. 8) and trained around a pulley 92 fixed to the forward end of the sleeve 86 by a key 92a.

An expander sleeve 94 is secured to the sleeve 86 by suitable bolts 95 and includes a tapered bore 94a which diverges outwardly to permit a machined workpiece W' to gradually expand as it is removed axially from the lapping drum D, so that the gap g gradually enlarges slightly relative to the positioning fin 62. When the machined workpiece W' clears the forward end of the expanding ring 94a, it is released and removed from the fin 62 to be received within a chute 96. If the rings W are of the flat type as shown in FIG. 5a, they are moved through the drum D without the drum D being oscillated.

THE BARREL OSCILLATING MECHANISM

If, however, barrel-shaped rings, as shown in FIG. 5b, are to be lapped, the oscillating mechanism O is operated. The oscillating mechanism O is connected with a shaft 97 which is fixed to the underside of the turntable 80 and is rotatably received within a bearing sleeve 98 secured within a bore 10b formed in a downwardly extending housing extension 10c. The lower end of the shaft 97 is journaled in a set of bearings 97a secured in the housing 10c in the normal manner. A bearing cap 98a for the assembly may be connected with the end of the housing 10c in any suitable manner such as bolts (not shown).

A drive rod 99 (FIG. 4) is fixed at one end to the shaft 97 and extends horizontally through apertures 98a and 10d formed in sleeves 98 and 10c respectively. The other end of the rod 99 is fixed to a rocking plate 100 which oscillates the shaft 97, and is movable between the fixed stops 104 mounted on a plate 104b by means of a single-acting, solenoid actuated, spring returned cylinder 105. The piston 106 of the cylinder 105 is connected to a bracket 107 pivotally connected with the bracket 100 by means of a pin 108. The cylinder 105 is pivotally connected with a bracket 108a on the housing 10 by means of a pin 109 as shown.

If flat rings are to be machined, the oscillating mechanism may be locked in a fixed position to prevent its oscillation. For this purpose, a removable locking pin 101 is fixed to the piston 102 of a double-acting solenoid actuated pneumatic cylinder 103 and is receivable in an aperture 100a formed in the plate 100.

THE CONTROL CIRCUIT

Figure 8:
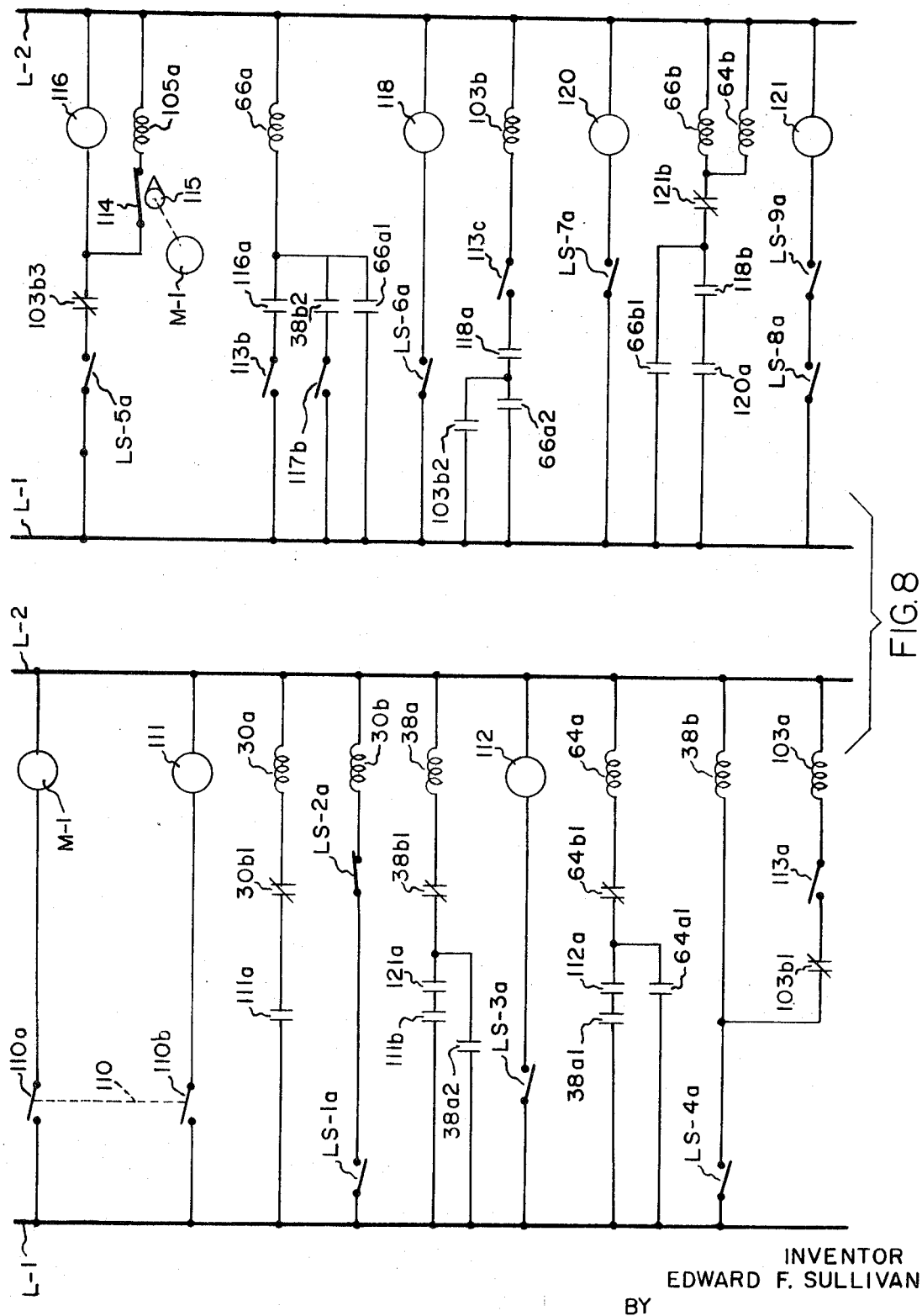
FIG. 8 is a schematic diagram of a typical electrical control circuit which is used in controlling the apparatus illustrated in FIGS. 1–4 and 6.

Referring now to FIG. 8, a schematic diagram of a typical electrical control circuit is illustrated and includes a pair of lines L-1 and L-2 connected across a suitable source of power such as 110 V, 60 cycle A.C. The start winding for the machining drum driving motor M-1 is connected in series, across the lines L-1 and L-2, with the contacts 110a of a start switch 110, and a holding relay 111 is connected in series across the lines L-1 and L-2 with the contacts 110b of the start switch 110. The relay 111 includes sets of normally open contacts 111a and 111b which are closed when the relay 111 is energized. For directing pneumatic pressure to the stack advancing cylinder 30, in a manner to move the piston rod 29 forwardly toward the left, and return toward the right, the usual valve actuating solenoids 30a and 30b, respectively, are provided. A pair of normally closed contacts, associated with the retract solenoid 30b, are shown at 30b1 connected in series with the advance solenoid 30a and the normally open contacts 111a of the relay 111. A limit switch LS-2, mounted on the stack supporting bracket 28 in the path of the stack clamping bracket 26, includes a set of normally closed contacts LS-2a which are opened when the stack pusher 25 is moved to a position for receiving a new stack S as shown in FIG. 1. At the front of a stack S, mounted on the plates 16, is a limit switch LS-1 which includes sets of normally open contacts LS-1a and normally closed contacts LS-1b which are closed and opened respectively when the stack pusher 25 is moved to the forward position. The normally open contacts LS-1a and the normally closed contacts LS-2a are connected in series with the return solenoid 30b of stack advancing cylinder 30 across the lines L-1 and L-2. The solenoids for controlling the flow of fluid to cylinder 38 so as to lower and raise the guillotine blade 34 are shown at 38a and 38b respectively. The advance solenoid 38a includes sets of normally open contacts 38a1 and 38a2 which are closed when the solenoid 38a is energized. The retract solenoid 38b includes a set of normally closed contacts 38b1.

A limit switch LS-8 is mounted on the rear portion of the top wall 10 and is engageable by the switch actuator 68' when the piston rod 68 of workpiece rotating cylinder 66 is in its rearmost position to close the normally open contacts LS-8a. A limit switch LS-9 is mounted on the top plate 10 and is actuable when the slide 52 moves rearwardly to the position shown in FIG. 1 to close the normally open contacts LS-9a. The contacts LS-8a and LS-9a are connected in series across the lines L-1 and L-2, with a relay 121, which includes a set of normally open contacts 121a which are closed when the relay 121 is energized. The normally open contacts 121a are connected in series circuit relation with the normally open contacts 111b, the normally closed contacts 38b1, and the guillotine lowering solenoid 38a.

The limit switch LS-3 (FIG. 3) is suitably mounted on apparatus (not shown) and is actuated when the guillotine is in the lowermost position to close the normally open contacts LS-3a which are connected in series circuit with a relay 112 having a set of normally open contacts 112a which close when the relay 112 is energized. The normally open contacts 38a2 of the solenoid 38a are connected in parallel with the contacts 111b and 121a.

The double-acting, solenoid operated slide operating cylinder 64 is movable forwardly and rearwardly when the solenoids 64a and 64b are actuated respectively. The solenoid 64a and the solenoid 64b include sets of normally open contacts 64a1 and normally closed contacts 64b1, respectively, which are closed and opened respectively when the solenoids 64a and 64b are energized. The solenoid 64a is connected in series circuit relation across the lines L-1 and L-2 with the set of normally closed contacts 64b1, the set of normally open contacts 112a, and the normally open set of contacts 38a1. The solenoid 64a, when energized, closes a set of normally open holding contacts 64a1 connected between the junction of the contacts 112a and 64b1 and the line L-1.

A limit switch LS-4 is mounted on the top plate 10 and is actuated when the slide 52 is moved forwardly to close the normally open contacts LS-4a connected in series circuit relation with the guillotine return solenoid 38b.

Figure 2:
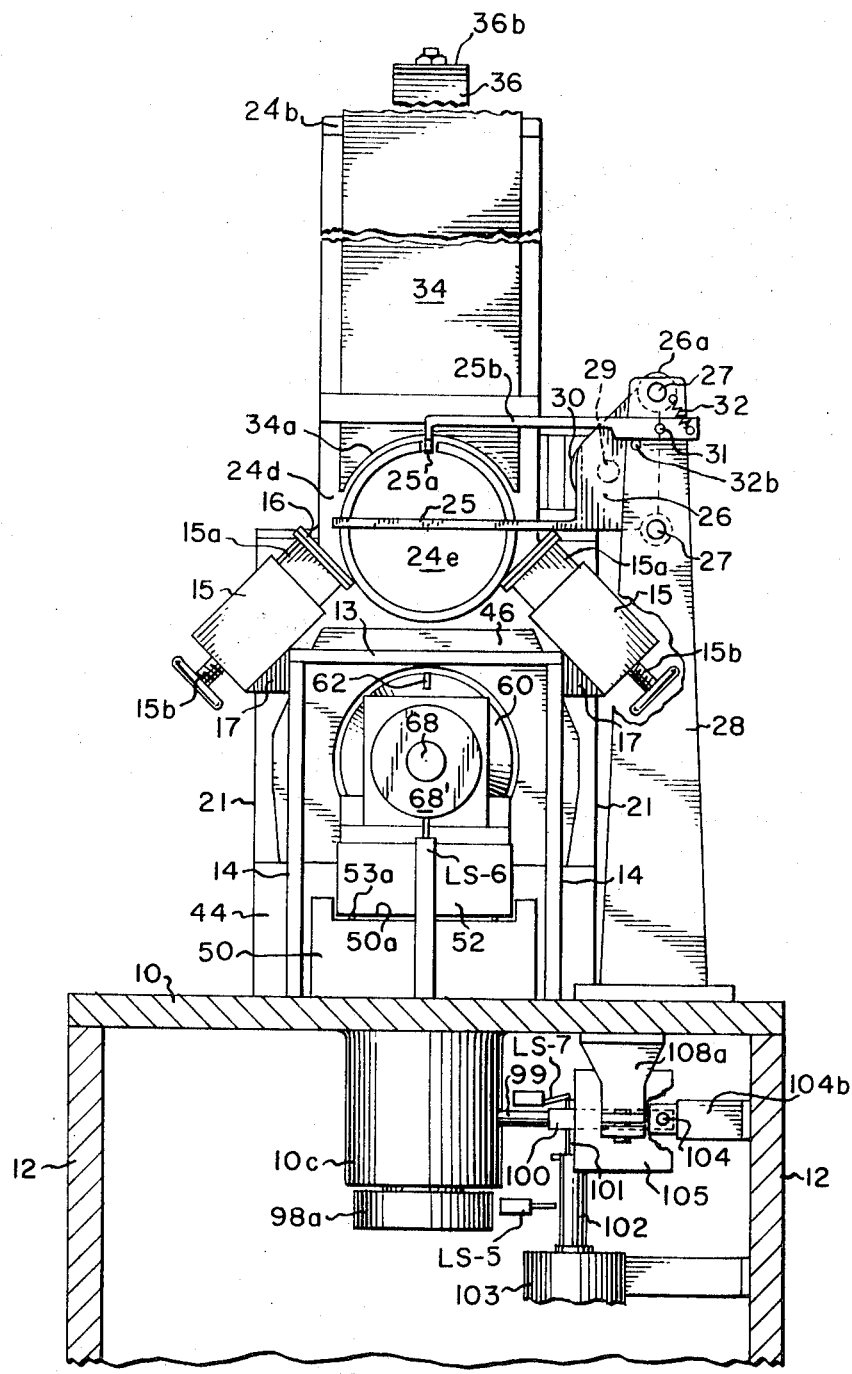
FIG. 2 is a partly sectional end elevational view of apparatus constructed according to the invention, taken along the line 2—2 of FIG. 1.

To actuate the cylinder 103 so as to retract the shot pin 101 from the bore 100a to permit oscillation of the lapping drum oscillating mechanism O and to return the locking pin 101 into the bore 100a, a pair of solenoids 103a and 103b are provided. The solenoid 103b, when energized, opens sets of normally closed contacts 103b1 and 103b3, and closes a set of normally open contacts 103b2. A switch 113, including sets of normally open ganged contacts 113a, 113b and 113c, is actuated when it is desired to oscillate the drum D about the axis of the shaft 97 so as to machine the barrel-shaped rings illustrated in FIG. 5b. The switch contacts 113a are connected in series with the solenoid 103a and the normally closed contacts 103b1 across the line L-2 and the junction of contacts LS-4a and the solenoid 38b. A limit switch LS-5a, shown in FIG. 2, is actuated when the shot pin 101 is retracted to close the normally open contacts LS-5a which are connected in series circuit relation with the normally closed contacts 103b3 of the relay 103b and a relay 116, which when energized, closes a normally open set of contacts 116a.

The solenoid for actuating the drum oscillating cylinder 105 to move the piston rod associated therewith forwardly to oscillate the lapping cylinder D is shown at 105a. A cam operated, spring closed switch 114 is connected in series circuit therewith between the lines L-2 and the junction of contacts 103b3 and the solenoid 116. A timing cam 115, driven by the motor M-1, periodically opens the switch 114 as required, depending upon the particular machining operation to be performed. For example, as a workpiece W passes through the lapping drum, the switch 114 will be opened and closed 15 times. The solenoids for actuating the pusher cylinder 66 to move the piston associated therewith forwardly and rearwardly are shown at 66a and 66b respectively. The solenoid 66a is connected in series circuit relation with the normally open contacts 116a and the normally open contacts 113b. As previously mentioned, the normally open contacts 113*b* of the switch 113 are closed when it is desired to place the machine in the oscillatory condition for machining the barrel-shaped rings shown in FIG. 5*b*. If the straight or flat rings shown in FIG. 5*a* are to be machined, the switch contacts 117*b* are closed. The switch contacts 117*b* are connected in series circuit relation with the normally open contacts 38*b*2 between the lines L–1 and the junction of contacts 116*a* and 66*a*1. The solenoid 66*a*, when energized, closes a set of holding contacts 66*a*1 which are connected in parallel with the contacts 117*b* and 38*b*2.

When the pusher cylinder piston rod 68 is in the forward position shown in FIG. 1, the switch actuator 68' actuates the limit switch LS–6, mounted on the top wall 10, to close the normally open contacts LS–6*a* connected in series circuit with a relay 118, which, when energized, closes sets of normally open contacts 118*a* and 118*b*. The solenoid 103*b* for raising the shot pin 101 is connected in series circuit relation across the lines L–1 and L–2 with the contacts 113*c*, the normally open contacts 118*a*, which are closed when the solenoid 118 is energized, and the normally open contacts 66*a*2 which are closed when the solenoid 66*a* is energized to move the ring holder 60 forwardly. A set of normally open holding contacts 103*b*2 are connected in parallel with the contact 66*a*2 and are closed when the solenoid 103*b* is energized.

A limit switch LS–7 is actuated when the pin 101 is moved into the aperture 100*a* by the cylinder 103 and closes the normally open contacts LS–7*a* which are connected in series circuit relation with a relay 120, which, when closed, closes the normally open contacts 120*a* associated therewith. The normally open contacts 120*a*, the normally open contacts 118*b*, and the normally closed contacts 121*b* are connected in series with the parallel circuit comprising the pusher retract solenoid 66*b* and the slide retract solenoid 64*b*. The normally open holding contacts 66*b*1 which are closed when the solenoid 66*b* is energized is connected in parallel with the contacts 120*a* and 118*b*. Typically, when the lapping drum D is being rotated at the rate of 65–300 revolutions per minute, workpieces 4 inches in diameter may be fed through the drum D at the rate of 1.13 feet to 5.25 feet per second.

THE OPERATION

If barrel-shaped rings, as shown in FIG. 5*b*, are to be lapped the switch 113 is manually actuated to close the switch contacts 113*a*, 113*b*, and 113*c* and the switch contacts 117*b* remain open. It will be assumed that the positioning fin 62 is initially in the rearward position shown in FIG. 3 and that the slide 34 is in the raised position as shown in FIG. 1. When the start switch 110 is closed to close the contacts 110*a* and 110*b*, the motor M–1 drives the drum D to rotate the cast iron members 90 in one direction. The relay 111 closes the contacts 111*a* to energize the solenoid 30*a* and move the stack pusher 25 forwardly to bias the stack S against the face 24*e* of the housing 24. With the pusher cylinder piston 68 and slide cylinder piston 64*a* in the rearward position shown in FIG. 3, the contacts LS–9*a* and LS–8*a* of limit switches LS–9 and LS–8 will be closed to actuate the solenoid 121 and the guillotine lowering solenoid 38*a* will be actuated to move the guillotine blade 34 downwardly to strip the endmost workpiece W from the stack S and move it downwardly where it is guided by the guide 46 into the slot 48 of the closing sleeve C. The slot 48 is cut approximately half-way through the sleeve C so that the guillotine blade 48 moves approximately half-way through the closing sleeve C. As the guillotine reaches its lowermost position and the workpiece W is positioned in the closing sleeve C, the limit switch contacts LS–3*a* close to actuate the relay 112 whereby the contacts 112*a* close to actuate the slide solenoid 64*a* and move the slide 52 forwardly from the full line position, shown in FIG. 3, to the chain line position inside the lapping drum D, also shown in FIG. 3, so that the positioning fin 62 is received within the gap *g* of the workpiece in the closing sleeve and the workpiece W is moved axially in the tapered bore portion 42 to constrict the workpiece and close the gap around the positioning fin 62. When the slide 52 is moved forwardly, the limit switch LS–4 is actuated to close the contacts LS–4*a* and energize, the guillotine retract solenoid 38*b* to move the guillotine blade 38 from the position shown in FIG. 3 to the raised position shown in FIG. 1. Simultaneously, since barrel-shaped rings are to be machined, the pin 101 is retracted by the energization of the solenoid 103*a*. When the shot pin 101 is retracted, the contacts LS–5*a* are closed to actuate the solenoid 105*a* to oscillate the drum D about the axis of the shaft 97 as the switch 114 is alternately opened and closed. As the timing cam 115 opens the contacts 114, the piston 106*a* of the cylinder 105 is spring returned, and when the contacts 114 again close, the plunger 106*a* will again move forwardly.

With the switch 113*b* closed, and the relay 116 energized to close the normally open contacts 116*a*, the solenoid 66*a* is energized to move the pusher ring 60 forwardly from the dotted line position shown in FIG. 3 to the full line position shown in FIG. 1. The nut 56 simultaneously rotates the pusher ring 60 about its longitudinal axis in a direction opposite to the direction of rotation of the drum D. When the ring holder 60 has pushed the workpiece W' beyond the expanding ring 94, the workpiece W' passes downwardly to the discharge chute 96 and the switch actuator 68' engages the limit switch LS–6 to close the contacts LS–6*a* and energize the relay 118 which closes the contacts 118*a* to energize the solenoid 103*b* and raise the pin 101 into the aperture 100*a* to lock the bracket 100 and prevent its oscillation on the return portion of the stroke. When the pin is in the aperture 100*a*, the limit switch LS–7 is actuated to close the normally open contacts LS–7*a* which actuates the relay 120 closing the contacts 120*a* which energizes the pusher retract solenoid 66*b* and the slide retract solenoid 64 *b* to move the pusher ring 60 rearwardly and the slide 52 rearwardly until they return to the position shown in FIG. 3. When the slide 52 and ball screw 58 returns to the position shown in FIG. 1, the limit switches LS–8 and LS–9 are closed to close the contacts LS–8*a* and LS–9*a* and the cycle is repeated.

If flat rings of the type illustrated in FIG. 5*a* are to be machined, the operation is generally similar except that the drum D is not oscillated about the axis of the shaft 97. The switch 113 is not actuated so that the contacts 113*a*, 113*b* and 113*c* remain open, however, the switch contacts 117*b* are closed so that the pusher cylinder advance solenoid 66*a* is energized when the guillotine blade 34 is raised by the actuation of the solenoid 38*b*.

Since it is obvious that many changes and modifications can be made in the machine described without departing from the nature and spirit of the invention, it is to be understood that the invention is defined in the appended claims.

I claim:
1. Apparatus for machining ring-shaped workpieces, each having a gap therein, comprising:
   tubular machining means forming a machining station for receiving a workpiece and machining the radially outer peripheral surface of a workpiece;
   workpiece holding and positioning means for individually receiving and positioning unmachined workpieces on one side of said machining station;
   said workpiece holding and positioning means and said machining means being relatively axially reciprocably movable and relatively rotatable;
   drive means for relatively axially moving said holding and positioning means and said machining means toward and away from each other to move a workpiece from said one side through said machining station to the other side of said machining station; and
   means for relatively rotating said holding and positioning means and said machining means when a workpiece is axially passing through said machining station;
   said workpiece holding and positioning means including means receivable in said gap for releasably holding said workpiece in said machining means when said machining means and said holding and positioning means are being relatively axially moved and holding said workpiece in a manner such that the workpiece is released when it reaches the opposite side of said machining station.

2. Apparatus as set forth in claim 1 wherein said means for relatively rotating said holding and positioning means and said machining means includes means for rotating said holding and positioning means in one direction and means for rotating said machining means in an opposite direction.

3. Apparatus as set forth in claim 1 including means mounting said machining means for oscillatory movement about an axis extending angularly to the machining axis of said machining means; and means for oscillating said machining means about said angularly extending axis when said machining means and said holding and positioning means are being relatively reciprocated and rotated to machine a workpiece.

4. Apparatus as set forth in claim 1 including constricting means disposed between said machining means and said holding and positioning means for receiving and constricting said workpieces prior to the machining of said workpieces; said holding and positioning means including a positioning fin movable from a remote position to a gap entering position to hold said workpiece and prevent it from rotating relative thereto; and drive means for relatively axially moving said positioning fin and said constricting means to radially contract a workpiece and close said gap around said positioning fin.

5. Apparatus as set forth in claim 1 including means for supporting a stack of individual, unmachined ring-shaped workpieces; and means for individually stripping said workpieces from said stack of workpieces and moving them to a position to be received by said positioning means.

6. Apparatus as set forth in claim 5 wherein said support means comprises means yieldably urging said stack of workpieces toward said stripping means; said stripping means comprising a guillotine transversely movable of said stack.

7. Apparatus for machining expansible and contractible ring-shaped workpieces, each having a gap therein, comprising:
   tubular machining means forming a machining station for machining the outer peripheral surfaces of said workpieces;
   support means for receiving and supporting said workpieces adjacent said machining means;
   workpiece holding and positioning means including gap entering means selectively relatively movable from a remote position to a position entering the gap of a workpiece on said support means;
   said workpiece holding and positioning means and said machining means and support means being relatively axially reciprocably movable;
   said support means comprising constricting means for constricting a workpiece supported thereon when said support means and said holding and positioning means are relatively axially moved;
   said workpiece positioning means and said machining means being relatively rotatable, when a workpiece is passing through said work station;
   drive means for relatively axially moving said holding and positioning means and said support means toward and away from each other without relatively rotating said holding and positioning means and support means to move said holding and positioning means between said remote position and said gap entering position and to move a workpiece relative to said constricting means to constrict said workpiece and close said gap;
   drive means for relatively axially reciprocating said holding and positioning means and said machining means to move a workpiece through said machining station; and
   means for relatively rotating said holding and positioning means and said machining means as said workpiece is axially being moved through said machining station.

8. Apparatus as set forth in claim 7 including means for supporting a stack of workpieces adjacent said support means; and means for individually stripping said workpieces from said stack and delivering them to said support means.

9. Apparatus as set forth in claim 7 wherein said workpiece holding and positioning means comprises a ring mounting pusher member, mounting an upper ring positioning fin, receivable in the gap of a workpiece positioned in said constricting means to prevent the rotation of said workpiece relative thereto, and said pusher member is disposed out of the path of the stripping means when the stripping means is moving a workpiece to the support means.

10. Apparatus as set forth in claim 7 wherein said constricting means comprises a sleeve having a converging passage therethrough for constricting said rings as they are moved toward said machining means.

11. Apparatus for individually machining ring-shaped workpieces having an axially curvilinear peripheral surface comprising:
   tubular machining means providing a machining station for individually receiving and machining said workpieces passing along the axis thereof;
   means mounting said tubular machining means for oscillatory movement about a second axis extending angularly to the axis of the machining means;
   feeding means for individually feeding workpieces through said machining station;
   said feeding means and said machining means being relatively reciprocably movable and simultaneously relatively rotatable;
   drive means for relatively reciprocating and rotating said feeding means and said machining means; and
   means for oscillating said tubular machining means about said second axis, when a workpiece is passing along the machining axis through said machining station to machine the outer peripheral curvilinear surface of said workpiece.

12. The apparatus of claim 11 wherein said feeding means includes means receiving a workpiece on one side of said machining station and releasably holding said workpiece in said machining means when said machining means and feeding means are being relatively rotated and reciprocated in a manner such that the workpiece is released when it reaches the opposite side of said machining station.

13. Apparatus for machining ring-shaped workpieces each having a gap therein comprising:
   rotatable tubular machining means forming a machining station for receiving a workpiece and machining the radially outer peripheral surface of a workpiece;
   axially movable workpiece feeding means, for feeding a workpiece through said machining station, said feeding means including means receivable in the gap of said workpiece for preventing rotation of the workpiece relative thereto during the axial movement;
   drive means for axially moving said feeding means toward and away from said machining means;
   drive means for rotating said tubular machining means in one direction; and
   means for rotating said feeding means in an opposite direction.

14. Apparatus as set forth in claim 13 wherein said means for rotating said feeding means comprises cooperating screw and nut means which rotates said feeding means responsive to the linear motion of said drive means.

15. Apparatus as set forth in claim 12 including means for rendering said oscillating means inoperative when said machining means and feeding means are being relatively reciprocated so as to return said feeding means from said opposite side to said one side of said machining station.

* * * * *